United States Patent
Lee et al.

(10) Patent No.: US 11,814,006 B2
(45) Date of Patent: Nov. 14, 2023

(54) AIRBAG APPARATUS FOR VEHICLE

(71) Applicant: HYUNDAI MOBIS CO., LTD., Seoul (KR)

(72) Inventors: Seok Min Lee, Yongin-si (KR); Dong Young Kim, Hwaseong-si (KR); Ga Ram Jeong, Yongin-si (KR); Jae Hyun Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/930,360

(22) Filed: Sep. 7, 2022

(65) Prior Publication Data

US 2023/0144430 A1 May 11, 2023

(30) Foreign Application Priority Data

Nov. 11, 2021 (KR) .................. 10-2021-0154717

(51) Int. Cl.
*B60R 21/2338* (2011.01)
*B60R 21/205* (2011.01)
*B60R 21/16* (2006.01)

(52) U.S. Cl.
CPC ........ *B60R 21/2338* (2013.01); *B60R 21/205* (2013.01); *B60R 2021/161* (2013.01); *B60R 2021/23384* (2013.01); *B60R 2021/23388* (2013.01)

(58) Field of Classification Search
CPC ............. B60R 21/2338; B60R 21/205; B60R 2021/161; B60R 2021/23384; B60R 2021/23388
See application file for complete search history.

(56) References Cited

U.S. PATENT DOCUMENTS

| | | | | |
|---|---|---|---|---|
| 7,354,064 B2 * | 4/2008 | Block | ................ | B60R 21/2338 |
| | | | | 280/739 |
| 7,784,828 B2 * | 8/2010 | Matsu | .................. | B60R 21/233 |
| | | | | 280/739 |
| 10,293,775 B2 * | 5/2019 | Wang | .................... | B60R 21/233 |
| 11,299,123 B2 * | 4/2022 | Park | .................. | B60R 21/01554 |
| 2004/0012180 A1 * | 1/2004 | Hawthorn | ............. | B60R 21/233 |
| | | | | 280/739 |
| 2007/0205591 A1 * | 9/2007 | Bito | ...................... | B60R 21/233 |
| | | | | 280/743.2 |

(Continued)

FOREIGN PATENT DOCUMENTS

| | | | | |
|---|---|---|---|---|
| DE | 102019119920 A1 * | 1/2020 | .......... | B60R 21/203 |
| KR | 2017-0002780 | 1/2017 | | |
| KR | 20190085490 A * | 7/2019 | | |

OTHER PUBLICATIONS

English Language Abstract of KR 2017-0002780 published Jan. 9, 2017.

*Primary Examiner* — Drew J Brown
(74) *Attorney, Agent, or Firm* — DLA PIPER LLP (US)

(57) ABSTRACT

An airbag apparatus for a vehicle, in which a lateral tether is disconnected or a front tether is disconnected, in the event of a collision accident, depending on whether a passenger seated in a passenger seat is in a normal seating state or a relaxed seating state, such that a deployed airbag cushion may effectively protect not only a passenger seated in the passenger seat in the normal seating state but also a passenger seated in the passenger seat in the relaxed seating state.

10 Claims, 7 Drawing Sheets

(56) References Cited

U.S. PATENT DOCUMENTS

| | | | |
|---|---|---|---|
| 2012/0242070 A1* | 9/2012 | Paxton | B60R 21/2338 |
| | | | 280/743.2 |
| 2017/0015266 A1* | 1/2017 | El-Jawahri | B60R 21/26 |
| 2017/0072897 A1* | 3/2017 | Kruse | B60R 21/2338 |
| 2018/0304844 A1* | 10/2018 | Nagasawa | B60R 21/01512 |
| 2019/0263347 A1* | 8/2019 | Choi | B60R 21/2338 |
| 2019/0329728 A1* | 10/2019 | Malapati | B60R 21/0136 |
| 2020/0031304 A1* | 1/2020 | Malapati | B60R 21/2035 |

* cited by examiner

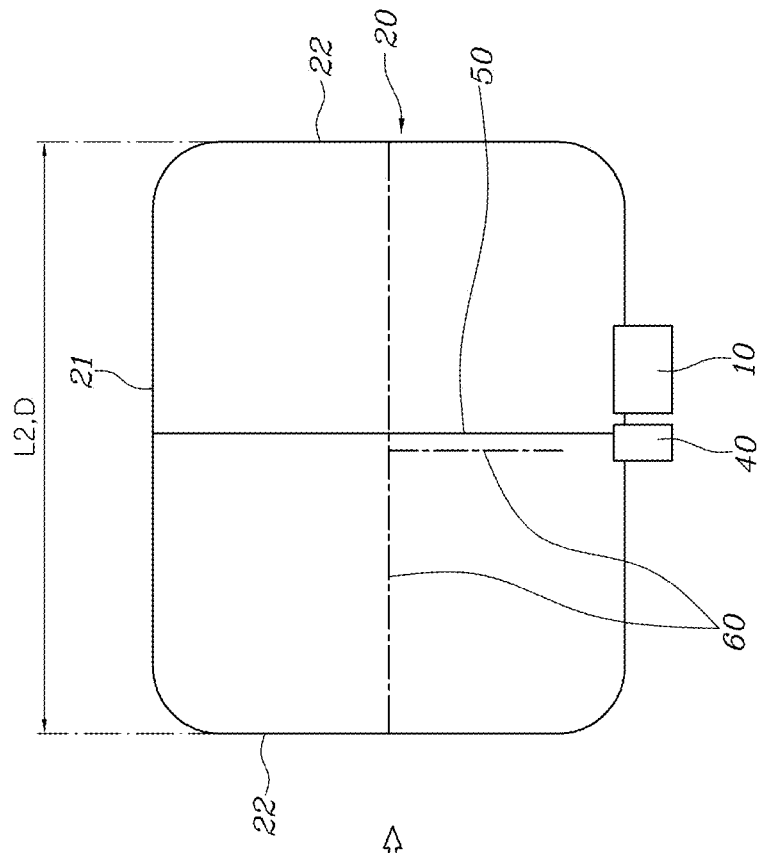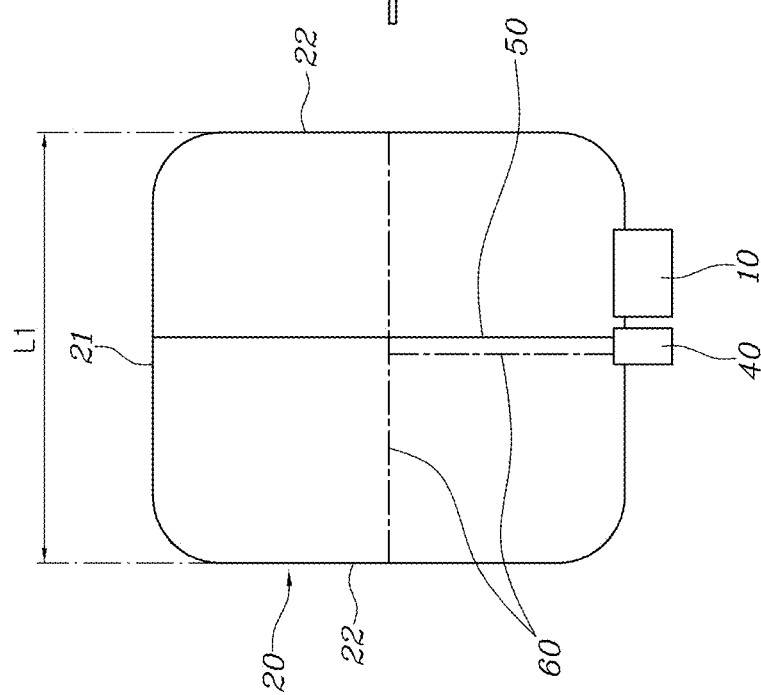

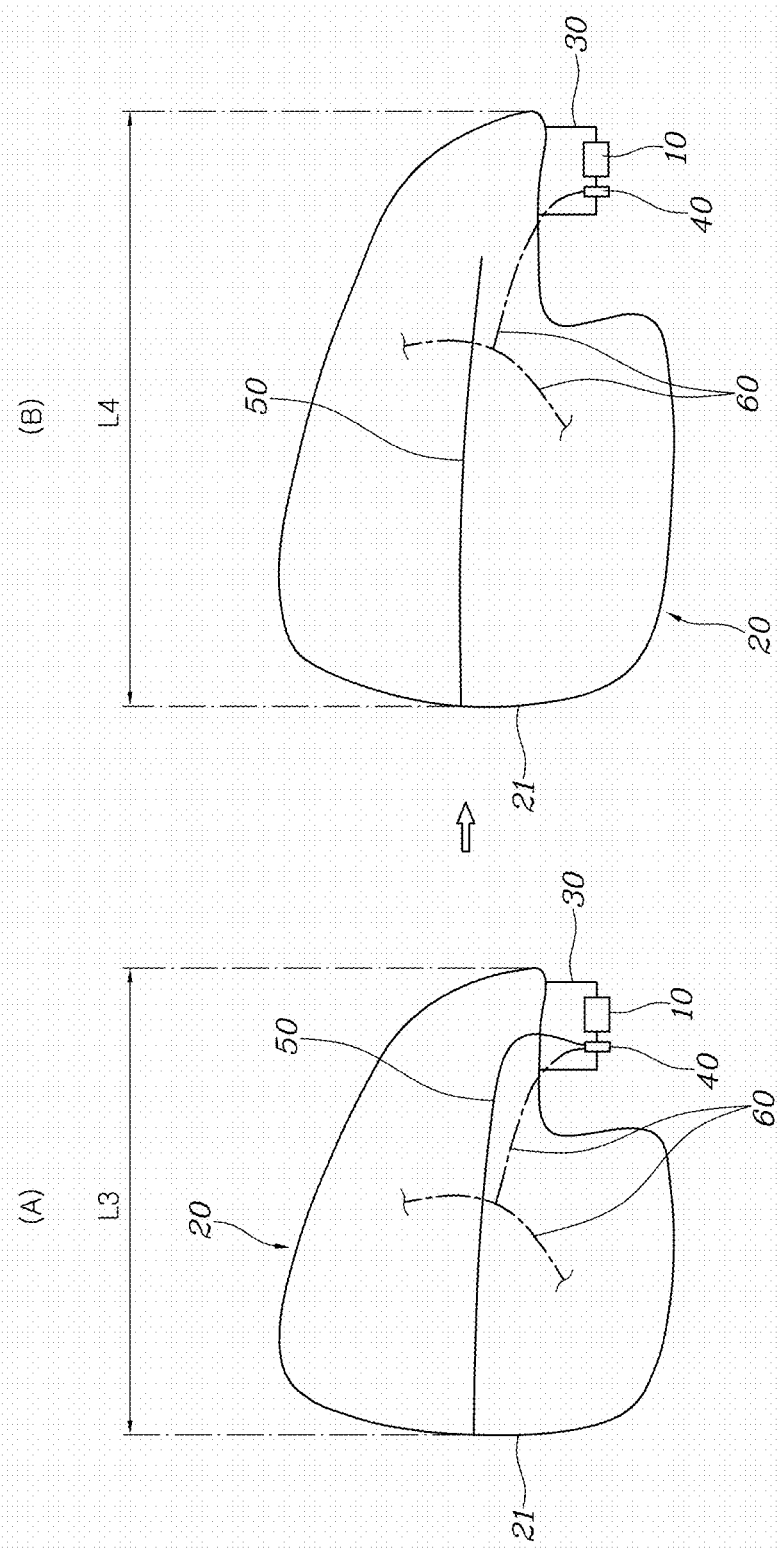

AIRBAG APPARATUS FOR VEHICLE

CROSS REFERENCE TO RELATED APPLICATION

The present application claims priority to Korean Patent Application No. 10-2021-0154717, filed Nov. 11, 2021, the entire contents of which is incorporated herein for all purposes by this reference.

BACKGROUND OF THE INVENTION

Field of the Invention

The present invention relates to an airbag apparatus for a vehicle, and more particularly, to a technology related to an airbag apparatus for a vehicle, which is capable of effectively protecting not only a passenger normally seated in a passenger seat but also a passenger relaxedly seated in the passenger seat.

Description of the Related Art

An autonomous vehicle refers to a smart vehicle to which an autonomous driving technology is applied so that the vehicle autonomously arrives at a destination even though a driver does not directly manipulate a steering wheel, an accelerator pedal, and a brake pedal. Recently, the autonomous vehicle is actively developed.

In a case in which autonomous driving is universally implemented, the driver may select a relaxed mode in which the driver may take a rest without directly driving the vehicle while the vehicle travels. In the relaxed mode, a movement, a rotation, and a posture of a seat may be variously changed to meet the passenger's request.

That is, a passenger seated in a passenger seat may select a general, normal seating posture and a relaxed seating posture in which the passenger may travel while taking a rest comfortably in the autonomous driving situation.

The normal seating state and the relaxed seating state may be defined depending on an angle of a seatback. Typically, the normal seating state may be defined as a state in which the seatback is rotated rearward within a range of 20 to 25 degrees based on a state in which the seatback is upright at 90 degrees. The relaxed seating state may be defined as a state in which the seatback is rotated rearward by 40 degrees or more.

In a situation in which the seating condition of the passenger seated in the passenger seat may be changed to the normal seating posture and the relaxed seating posture, a degree to which an airbag cushion of an airbag apparatus provided in a vehicle in the related art protrudes forward in the event of an accident is insufficient, which makes it difficult to effectively protect a passenger relaxedly seated in the passenger seat. For this reason, a degree of injury to the passenger relaxedly seated in the passenger seat increases.

The foregoing explained as the background is intended merely to aid in the understanding of the background of the present invention, and is not intended to mean that the present invention falls within the purview of the related art that is already known to those skilled in the art.

SUMMARY OF THE INVENTION

The present invention is proposed to solve these problems and aims to provide an airbag apparatus for a vehicle, in which an operation of deploying an airbag cushion in the event of an accident varies depending on whether a passenger seated in a passenger seat is in a normal seating posture or a relaxed seating posture, thereby effectively protecting not only a normally seated passenger but also a relaxedly seated passenger. Therefore, the present invention aims to further improve a function of protecting the passenger.

An embodiment of the present invention provides an airbag apparatus for a vehicle, the airbag apparatus including: an airbag cushion configured to be deployed toward a passenger by receiving airbag gas generated by an inflator; a tether releasing device fixed to an airbag housing and configured to operate in response to an electrical signal; a front tether configured to connect a front portion of the airbag cushion and the tether releasing device and configured to be disconnected when the tether releasing device operates; and a lateral tether configured to connect two opposite side portions of the airbag cushion and the tether releasing device and configured to be disconnected when the tether releasing device operates.

The airbag housing may be positioned at a position opposite to the front portion of the airbag cushion, and the inflator and the tether releasing device may be fixedly installed in the airbag housing.

The inflator and the tether releasing device may operate in response to an electrical signal of an airbag controller configured to receive a signal of a collision sensor and a signal of a seatback angle sensor.

When the tether releasing device does not operate, the tether releasing device may hold the front tether and the lateral tether to maintain a shape of the deployed airbag cushion, and when the tether releasing device operates in response to an electrical signal of an airbag controller, the tether releasing device may disconnect any one of the front tether and the lateral tether.

The tether releasing device may include: a first operation part connected to the front tether and configured to operate to disconnect the front tether; and a second operation part connected to the lateral tether and configured to operate to disconnect the lateral tether, and the first operation part and the second operation part may independently operate in response to electrical signals of an airbag controller.

The lateral tether may be connected to the tether releasing device, extend toward the front portion of the airbag cushion, and then divided into two lines, such that ends of the two lines are respectively coupled to left and right side portions of the airbag cushion by sewing.

A length of the lateral tether may be set so that left and right side portions of the airbag cushion are pulled by the lateral tether in a direction in which the airbag cushion is deployed and the lateral tether connects the tether releasing device and the two opposite side portions of the airbag cushion.

When a collision accident occurs in a state in which a passenger seated in a passenger seat is in a normal seating state, the airbag cushion may be deployed, the lateral tether may be disconnected by an operation of the tether releasing device, and a state in which the front tether connects the tether releasing device and the front portion of the airbag cushion may be maintained.

Based on a deployed state of the airbag cushion, a length of the airbag cushion in a leftward/rightward direction when the lateral tether is disconnected may be longer than a length of the airbag cushion in the leftward/rightward direction when the lateral tether is not disconnected, such that a width of the airbag cushion in the leftward/rightward direction is increased.

When a collision accident occurs in a state in which a passenger seated in a passenger seat is in a relaxed seating state, the airbag cushion may be deployed, the front tether may be disconnected by an operation of the tether releasing device, and a state in which the lateral tether connects the tether releasing device and the two opposite side portions of the airbag cushion may be maintained.

Based on a deployed state of the airbag cushion, a length of the airbag cushion in a forward/rearward direction when the front tether is disconnected may be longer than a length of the airbag cushion in the forward/rearward direction when the front tether is not disconnected.

According to the airbag apparatus for a vehicle according to the embodiment of the present invention, the lateral tether connecting the left and right side portions of the airbag cushion is disconnected when a collision accident occurs in the state in which the passenger seated in the passenger seat is in the normal seating state, such that the width of the airbag cushion in the leftward/rightward direction may be increased. Therefore, it is possible to optimally maintain the volume of the airbag cushion and thus effectively protect the passenger seated in the passenger seat in the normal seating state.

In addition, according to the airbag apparatus for a vehicle according to the present invention, when a collision accident occurs in the state in which the passenger seated in the passenger seat is in the relaxed seating state, the front tether connecting the front portion of the airbag cushion is disconnected, such that the length of the airbag cushion in the forward/rearward direction may be increased. Therefore, it is possible to restrain the upper body of the passenger seated in the passenger seat in the relaxed seating state at an early stage and thus more effectively protect the passenger seated in the passenger seat in the relaxed seating state.

BRIEF DESCRIPTION OF THE DRAWINGS

FIGS. 5A and 5B are views for explaining a state of FIG. 4, in which FIG. 5A is a view illustrating a state in which a lateral tether is not disconnected, and FIG. 5B is a view illustrating a state in which the lateral tether is disconnected.

FIGS. 7A and 7B are views for explaining a state of FIG. 6, in which FIG. 7A is a view illustrating a state in which a front tether is not disconnected, and FIG. 7B is a view illustrating a state in which the front tether is disconnected.

DETAILED DESCRIPTION OF THE INVENTION

Figure 1:
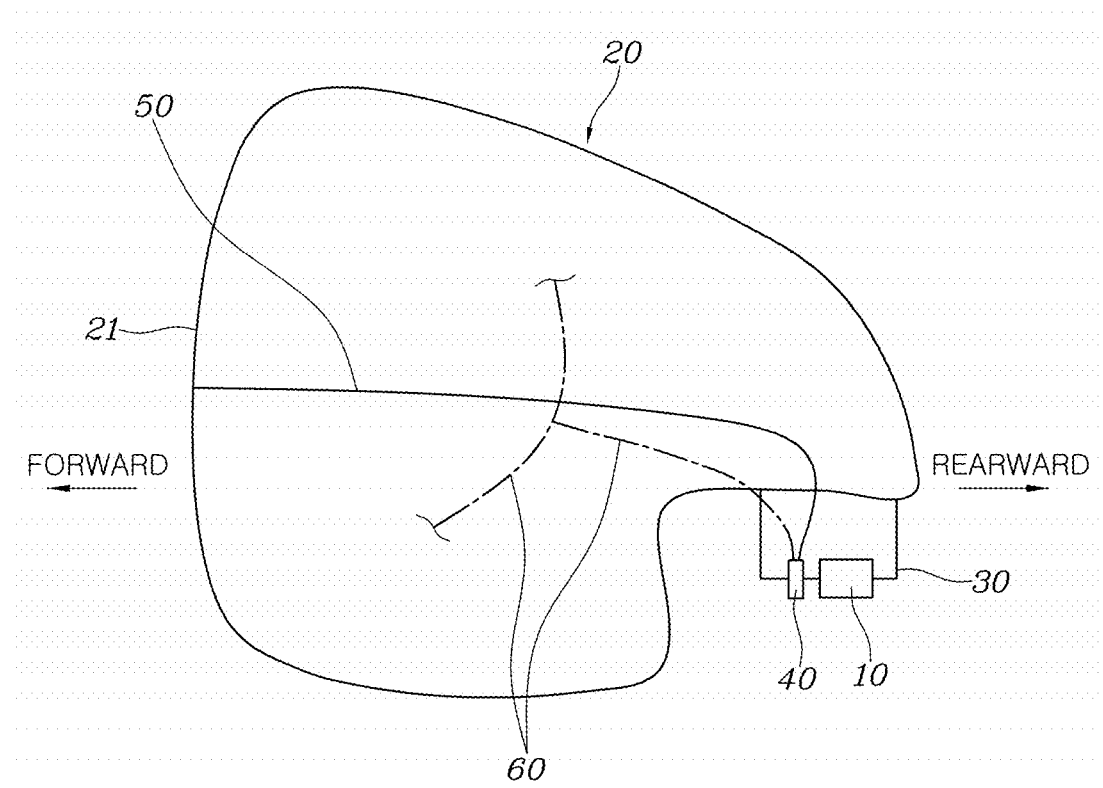
FIG. 1 is a view illustrating a state in which a passenger seat airbag apparatus according to the present invention is deployed.
Figure 2:
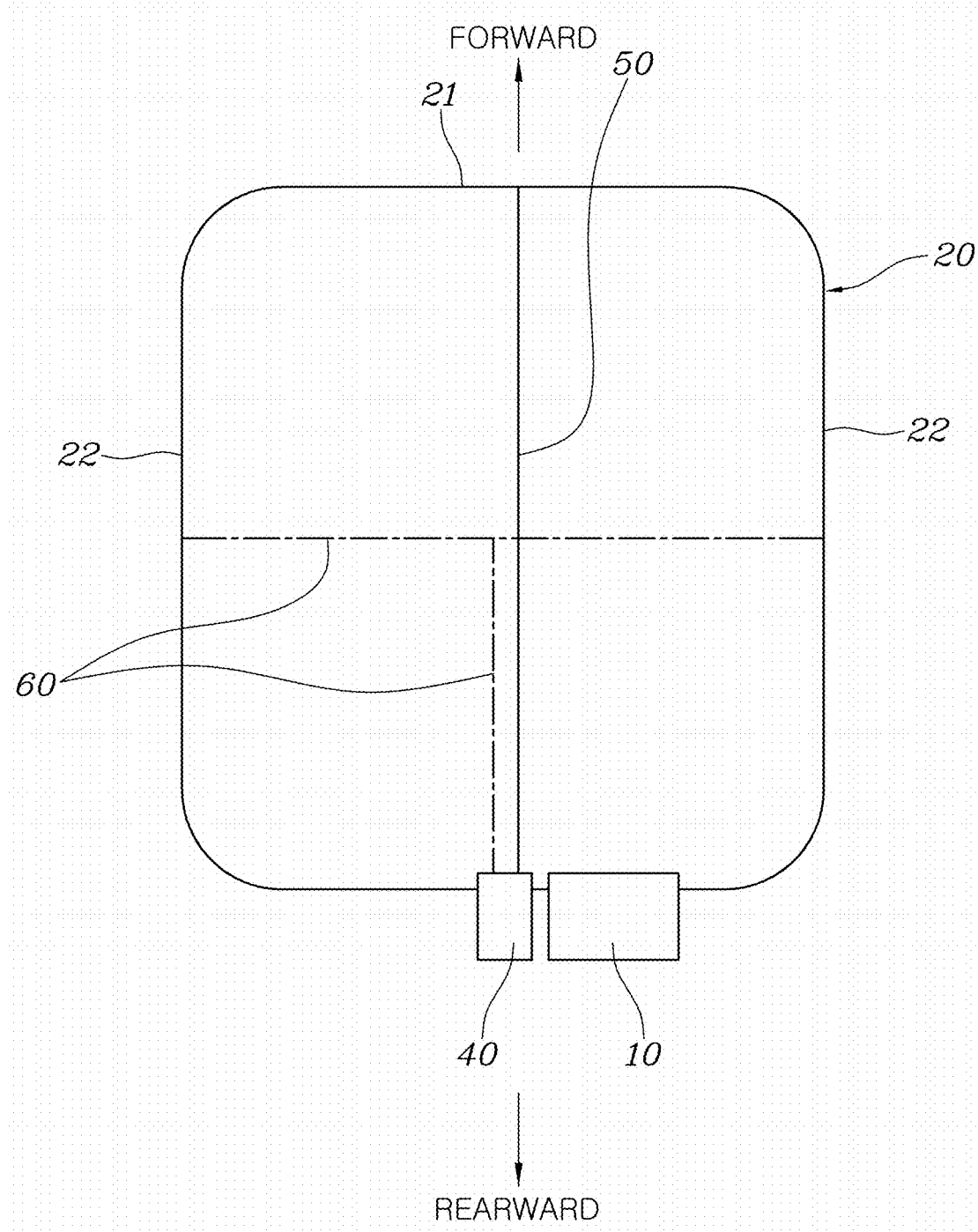
FIG. 2 is a top plan view of FIG. 1.
Figure 3:
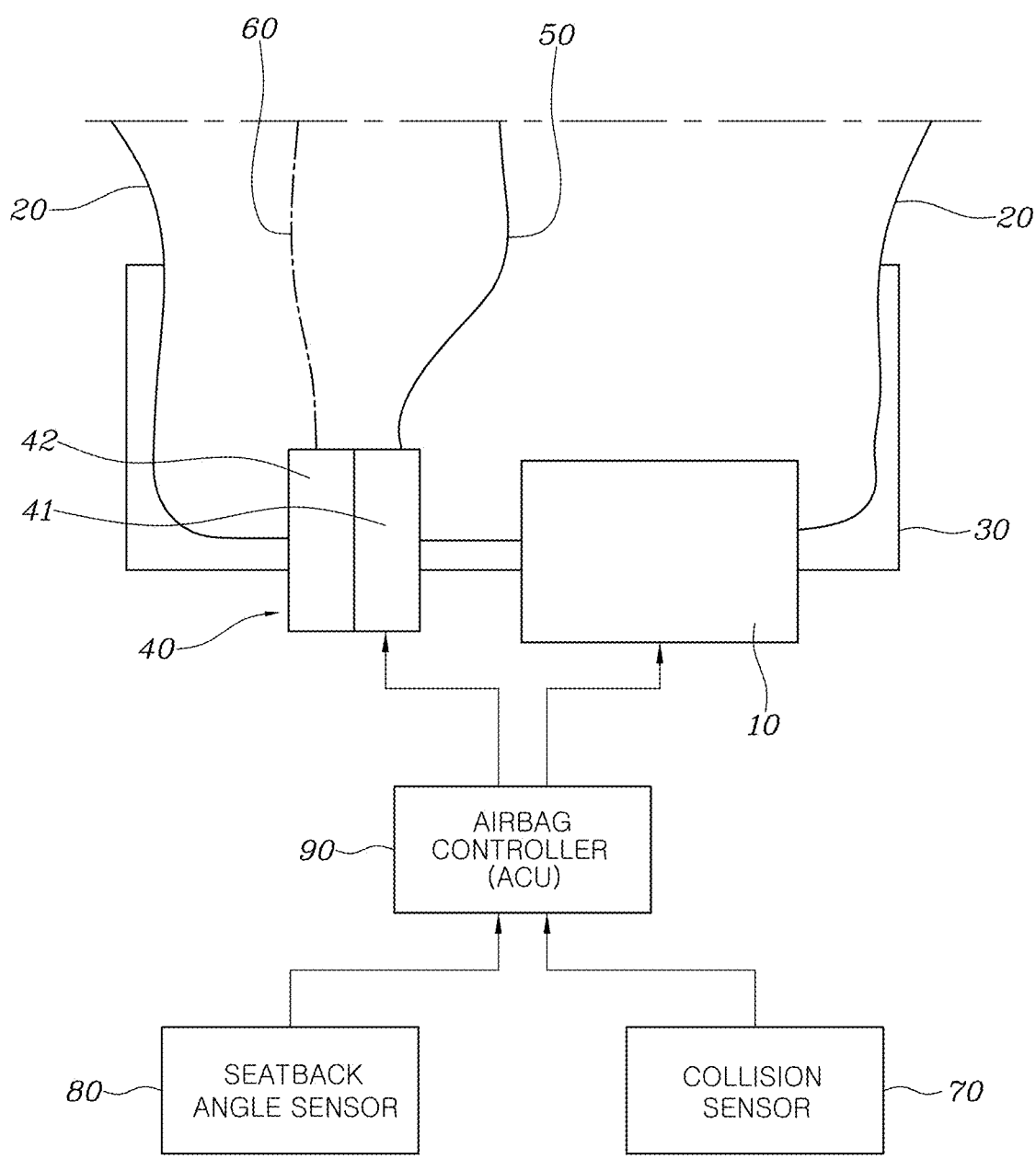
FIG. 3 is an enlarged view for explaining a configuration of an airbag apparatus according to the present invention.

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used only for the purpose of describing particular embodiments and are not intended to limit the present invention. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present specification.

A control unit (controller) according to an exemplary embodiment of the present invention may be implemented by a non-volatile memory (not illustrated) configured to algorithm for controlling operations of various constituent elements in a vehicle or store data related to software commands for executing the algorithm, and by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

Hereinafter, an airbag apparatus for a vehicle according to an exemplary embodiment of the present invention will be described with reference to the accompanying drawings.

An airbag apparatus for a vehicle according to the present invention is a passenger seat airbag apparatus that may be mounted in an instrument panel (dash panel) of a vehicle and operate to protect a passenger seated in a passenger seat. In particular, the airbag apparatus is configured to effectively protect the passenger seated in the passenger seat in both a normal seating state and a relaxed seating state.

That is, as illustrated in FIGS. 1 to 7, the airbag apparatus for a vehicle according to the present invention includes: an inflator 10 configured to operate to generate airbag gas; an airbag cushion 20 configured to be deployed toward the passenger seated in the passenger seat by receiving airbag gas generated by the inflator; a tether releasing device 40 fixed to the airbag housing 30 and configured to operate in response to an electrical signal; a front tether 50 configured to connect a front portion 21 of the airbag cushion 20 and the tether releasing device 40, the front tether 50 being configured to be disconnected when the tether releasing device 40 operates; and a lateral tether 60 configured to connect two opposite side portions 22 of the airbag cushion 20 and the tether releasing device 40, the lateral tether 60 being configured to be disconnected when the tether releasing device 40 operates.

The airbag housing 30 is fixedly installed on the instrument panel and disposed at a position opposite to the front portion 21 of the airbag cushion 20. The inflator 10 and the tether releasing device 40 are fixedly installed in the airbag housing 30.

The inflator 10 and the tether releasing device 40 operate in response to an electrical signal of an airbag controller (ACU) 90 configured to receive a signal of a collision sensor 70 mounted in the vehicle and a signal of a seatback angle sensor 80 mounted in a vehicle seat.

The normal seating state and the relaxed seating state of the passenger seated in the passenger seat are determined depending on an angle of a seatback of the passenger seat. Typically, the normal seating state may be as a state in which the seatback is rotated rearward within a range of 20 to 25 degrees based on a state in which the seatback is upright at 90 degrees. The relaxed seating state may be defined as a state in which the seatback is rotated rearward by 40 degrees or more.

The angle of the seatback of the passenger seat is detected by the seatback angle sensor 80, and a signal of the seatback angle sensor 80 is transmitted to the airbag controller 90. The airbag controller 90 receives a signal of the seatback angle sensor 80 and a signal of the collision sensor 70 and controls an operation of the inflator 10 and an operation of the tether releasing device 40.

The tether releasing device 40 according to the present invention operates in response to an electrical signal of the airbag controller 90. When the tether releasing device 40 does not operate, the tether releasing device 40 holds the front tether 50 and the lateral tether 60 to maintain a shape of the deployed airbag cushion 20. When the tether releasing device 40 operates, the tether releasing device 40 disconnects any one of the front tether 50 and the lateral tether 60.

The tether releasing device 40 may be configured as an explosive explosion device such as an inflator or a cutting device capable of easily cutting the tether so that the tether releasing device 40 may disconnect the front tether 50 or the lateral tether 60.

The tether releasing device 40 according to the present invention includes a first operation part 41 connected to the front tether 50 and configured to operate to disconnect the front tether 50, and a second operation part 42 connected to the lateral tether 60 and configured to operate to disconnect the lateral tether 60. The first operation part 41 and the second operation part 42 independently operate in response to the electrical signals of the airbag controller 90.

A rear end of the front tether 50 according to the present invention is connected to the first operation part 41 of the tether releasing device 40, and a front end of the front tether 50 is installed and coupled to the front portion 21 of the airbag cushion 20 by sewing.

A rear end of the lateral tether 60 according to the present invention is connected to the second operation part 42 of the tether releasing device 40, extends toward the front portion 21 of the airbag cushion 20, and then divided into two lines, such that ends of the two lines are respectively coupled to the left and right side portions 22 of the airbag cushion 20 by sewing.

Further, in a state in which the airbag cushion 20 is deployed and the lateral tether 60 connects the tether releasing device 40 and the two opposite side portions 22 of the airbag cushion 20, i.e., a state in which the lateral tether 60 is not disconnected, a length of the lateral tether 60 may be set to a length that may allow the left and right side portions 22 of the airbag cushion 20 to be pulled by the lateral tether 60. Therefore, the state of the deployed airbag cushion 20 may be maintained.

Figure 4:
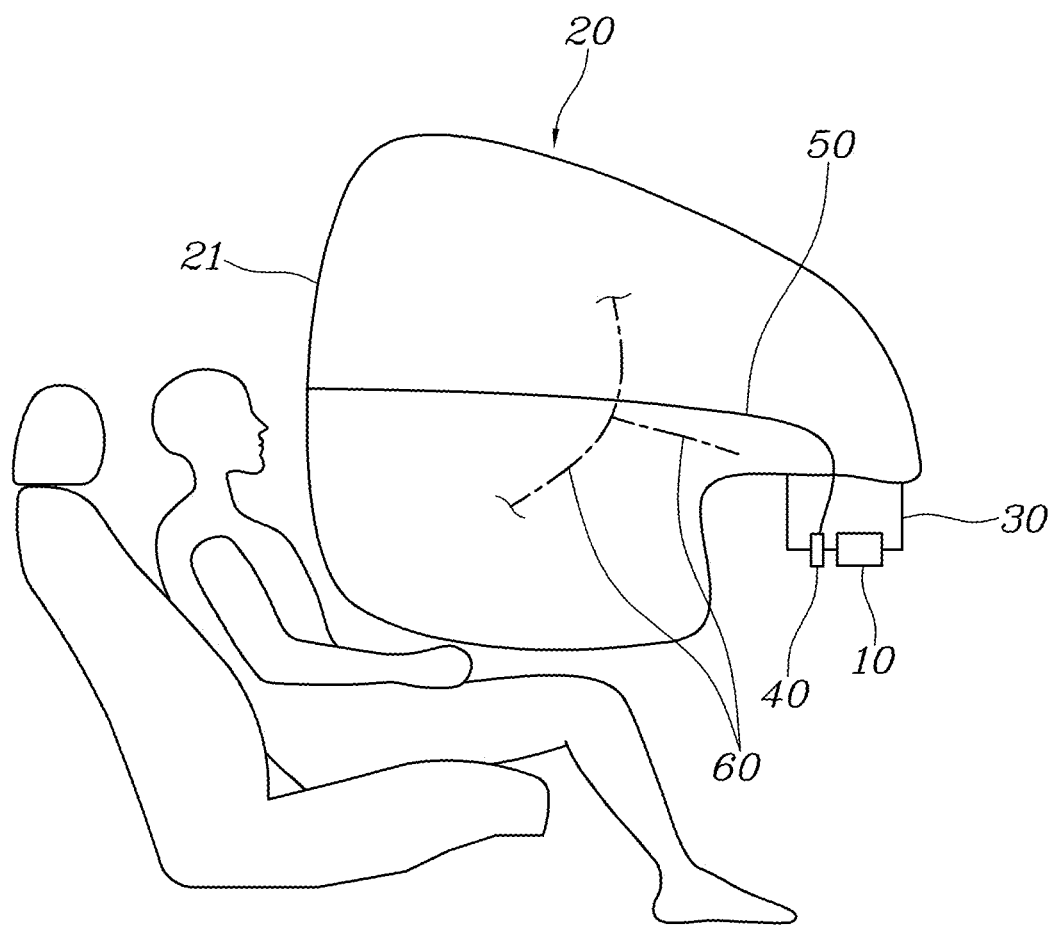
FIG. 4 is a view for explaining a state in which the airbag cushion according to the present invention is deployed in the event of a collision accident in a state in which a passenger seated in a passenger seat is in a normal seating posture.

FIG. 4 is a view for explaining a state in which the airbag cushion is deployed in the event of a collision accident in the state in which the passenger seated in the passenger seat is in the normal seating state. FIG. 5A is a view illustrating a state in which the lateral tether is not disconnected, and FIG. 5B is a view illustrating a state in which the lateral tether is disconnected.

As illustrated, when a collision accident occurs in the state in which the passenger seated in the passenger seat is in the normal seating state, the inflator 10 operates in response to a control signal of the airbag controller 90 and generates airbag gas, and the airbag cushion 20 is deployed toward the passenger seated in the passenger seat by the airbag gas.

In addition, the second operation part 42 of the tether releasing device 40 operates in response to the control signal of the airbag controller 90 and disconnects the lateral tether 60, and the first operation part 41 of the tether releasing device 40 does not operate. Therefore, the state in which the front tether 50 connects the first operation part 41 of the tether releasing device 40 and the front portion 21 of the airbag cushion 20 is continuously maintained.

As described above, when the collision accident occurs in the state in which the passenger seated in the passenger seat is in the normal seating state, the lateral tether 60 is disconnected, and the state in which the front tether 50 connects the tether releasing device 40 and the front portion 21 of the airbag cushion 20 is maintained, a length of the deployed airbag cushion 20 in a forward/rearward direction is kept short, and instead, a width of the airbag cushion 20 in a leftward/rightward direction is extended and increased. Therefore, the airbag cushion 20 may maintain an optimal volume, thereby effectively protecting the passenger seated in the passenger seat in the normal seating state.

Based on the deployed state of the airbag cushion 20, a length L2 of the airbag cushion 20 in the leftward/rightward direction when the lateral tether 60 is disconnected as illustrated in FIG. 5B is longer than a length L1 of the airbag cushion 20 in the leftward/rightward direction when the lateral tether 60 is not disconnected as illustrated in FIG. 5A. Therefore, a width D of the airbag cushion 20 in the leftward/rightward direction may be increased, such that the airbag cushion 20 may maintain the optimal volume, thereby effectively protecting the passenger seated in the passenger seat in the normal seating state.

Figure 6:
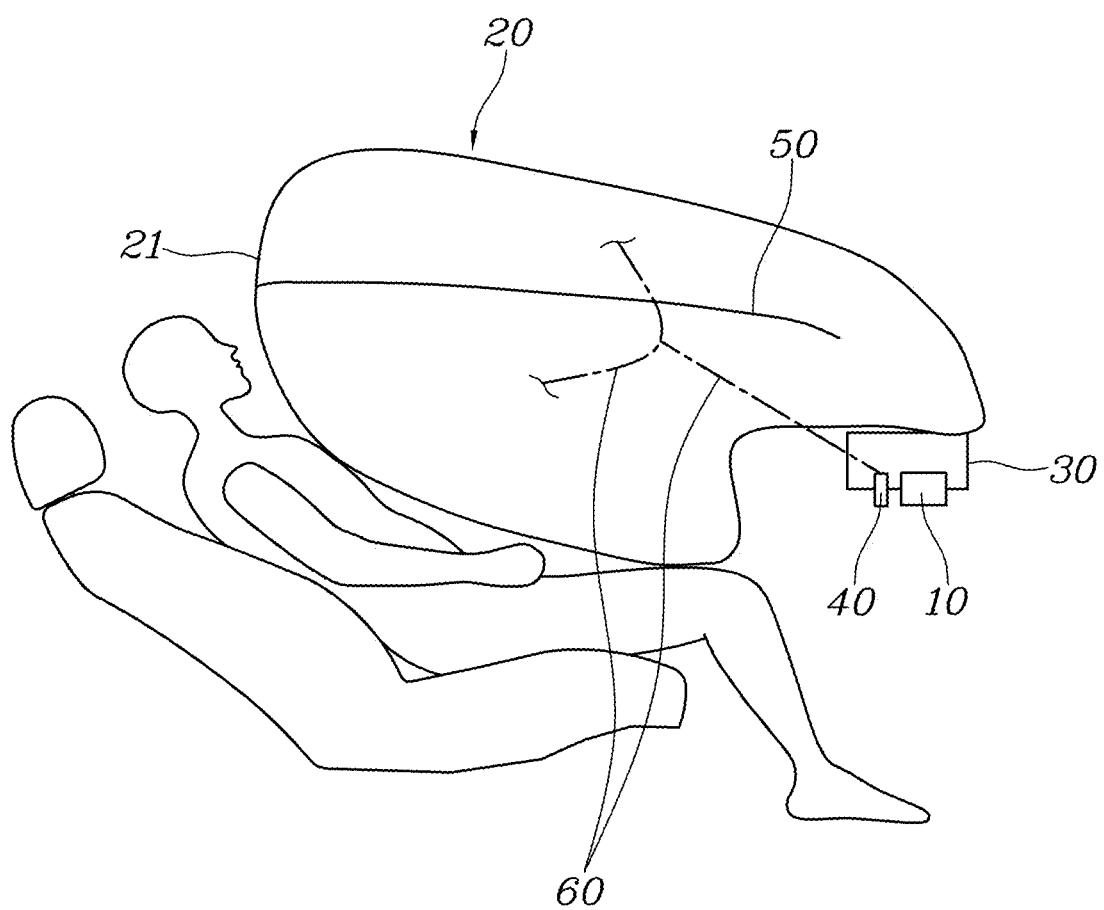
FIG. 6 is a view for explaining a state in which the airbag cushion according to the present invention is deployed in the event of a collision accident in a state in which a passenger seated in the passenger seat is in a relaxed seating posture.

FIG. 6 is a view for explaining a state in which the airbag cushion is deployed in the event of a collision accident in the state in which the passenger seated in the passenger seat in the relaxed seating state. FIG. 7A is a view illustrating a state in which the front tether is not disconnected, and FIG. 7B is a view illustrating a state in which the front tether is disconnected.

As illustrated, when a collision accident occurs in the state in which the passenger seated in the passenger seat is in the relaxed seating state, the inflator 10 operates in response to a control signal of the airbag controller 90 and generates airbag gas, and the airbag cushion 20 is deployed toward the passenger seated in the passenger seat by the airbag gas.

In addition, the first operation part 41 of the tether releasing device 40 operates in response to the control signal of the airbag controller 90 and disconnects the front tether 50, and the second operation part 42 of the tether releasing device 40 does not operate. Therefore, the state in which the lateral tether 60 connects the second operation part 42 of the tether releasing device 40 and the two opposite side portions 22 of the airbag cushion 20 is continuously maintained.

As described above, when the collision accident occurs in the state in which the passenger seated in the passenger seat is in the relaxed seating state, the front tether 50 is disconnected, and the state in which the lateral tether 60 connects the tether releasing device 40 and the side portions 22 of the airbag cushion 20 is maintained, a width of the deployed airbag cushion 20 in the leftward/rightward direction is restricted by the lateral tether 50, such that the volume is maintained, and instead, a length of the airbag cushion 20 in the forward/rearward direction is increased. Therefore, an upper body of the passenger seated in the passenger seat in the relaxed seating state may be restrained at an early stage, thereby more effectively protecting the passenger seated in the passenger seat in the relaxed seating state.

Based on the deployed state of the airbag cushion 20, a length L4 of the airbag cushion 20 in the forward/rearward direction when the front tether 50 is disconnected as illustrated in FIG. 7B is further extended and longer than a length L3 of the airbag cushion 20 in the forward/rearward direction when the front tether 50 is not disconnected as illustrated in FIG. 7A. Therefore, a length of the deployed airbag cushion 20 in the forward/rearward direction may be increased, such that the upper body of the passenger seated in the passenger seat in the relaxed seating state may be restrained at an early stage, thereby more effectively protecting the passenger seated in the passenger seat in the relaxed seating state.

As described above, according to the airbag apparatus for a vehicle according to the embodiment of the present invention, the lateral tether 60 connecting the left and right side portions 22 of the airbag cushion 20 is disconnected when a collision accident occurs in the state in which the passenger seated in the passenger seat is in the normal seating state, such that the width of the airbag cushion 20 in the leftward/rightward direction may be increased. Therefore, it is possible to optimally maintain the volume of the airbag cushion 20 and thus effectively protect the passenger seated in the passenger seat in the normal seating state.

In addition, according to the airbag apparatus for a vehicle according to the present invention, when a collision accident occurs in the state in which the passenger seated in the passenger seat is in the relaxed seating state, the front tether 50 connecting the front portion 21 of the airbag cushion 20 is disconnected, such that the length of the airbag cushion 20 in the forward/rearward direction may be increased. Therefore, it is possible to restrain the upper body of the passenger seated in the passenger seat in the relaxed seating state at an early stage and thus more effectively protect the passenger seated in the passenger seat in the relaxed seating state.

While the specific embodiments of the present invention have been illustrated and described, it will be obvious to those skilled in the art that the present invention may be variously modified and changed without departing from the technical spirit of the present invention defined in the appended claims.

What is claimed is:

1. An airbag apparatus for a vehicle, the airbag apparatus comprising:
   an airbag cushion configured to be deployed toward a passenger by receiving airbag gas generated by an inflator;
   a tether releasing device fixed to an airbag housing;
   a front tether configured to connect a front portion of the airbag cushion and the tether releasing device and configured to be disconnected when the tether releasing device operates; and
   a lateral tether configured to connect two opposite side portions of the airbag cushion and the tether releasing device and configured to be disconnected when the tether releasing device operates,
   wherein when a collision occurs while a passenger seated in a passenger seat is in a normal seating state, the airbag cushion is deployed, the lateral tether is disconnected by an operation of the tether releasing device, and a state in which the front tether connects the tether releasing device and the front portion of the airbag cushion is maintained.

2. The airbag apparatus of claim 1, wherein the airbag housing is positioned at a position opposite to a position of the front portion of the airbag cushion, and the inflator and the tether releasing device are installed in the airbag housing.

3. The airbag apparatus of claim 1, wherein the inflator and the tether releasing device operate in response to an electrical signal of an airbag controller configured to receive a signal of a collision sensor and a signal of a seatback angle sensor.

4. The airbag apparatus of claim 1, wherein the tether releasing device holds the front tether and the lateral tether to maintain a shape of the deployed airbag cushion when the tether releasing device is not operating, and the tether releasing device disconnects any one of the front tether and the lateral tether when the tether releasing device operates in response to an electrical signal of an airbag controller.

5. The airbag apparatus of claim 1, wherein the tether releasing device comprises:
   a first operation part connected to the front tether and configured to operate to disconnect the front tether; and
   a second operation part connected to the lateral tether and configured to operate to disconnect the lateral tether, wherein the first operation part and the second operation part independently operate in response to electrical signals of an airbag controller.

6. The airbag apparatus of claim 1, wherein the lateral tether is connected to the tether releasing device, extends toward the front portion of the airbag cushion, and is divided into two lines such that ends of the two lines are respectively coupled to left and right side portions of the airbag cushion.

7. The airbag apparatus of claim 1, wherein a length of the lateral tether is set so that left and right side portions of the airbag cushion are pulled by the lateral tether in a direction in which the airbag cushion is deployed and the lateral tether connects the tether releasing device and the two opposite side portions of the airbag cushion.

8. The airbag apparatus of claim 1, wherein based on a deployed state of the airbag cushion, a length of the airbag cushion in a forward/rearward direction when the front tether is disconnected is longer than a length of the airbag cushion in the forward/rearward direction when the front tether is not disconnected.

9. An airbag apparatus for a vehicle, the airbag apparatus comprising:
- an airbag cushion configured to be deployed toward a passenger by receiving airbag gas generated by an inflator;
- a tether releasing device fixed to an airbag housing;
- a front tether configured to connect a front portion of the airbag cushion and the tether releasing device and configured to be disconnected when the tether releasing device operates; and
- a lateral tether configured to connect two opposite side portions of the airbag cushion and the tether releasing device and configured to be disconnected when the tether releasing device operates,
- wherein based on a deployed state of the airbag cushion, a length of the airbag cushion in a leftward/rightward direction when the lateral tether is disconnected is longer than a length of the airbag cushion in the leftward/rightward direction when the lateral tether is not disconnected such that a width of the airbag cushion in the leftward/rightward direction is increased.

10. An airbag apparatus for a vehicle, the airbag apparatus comprising:
- an airbag cushion configured to be deployed toward a passenger by receiving airbag gas generated by an inflator;
- a tether releasing device fixed to an airbag housing;
- a front tether configured to connect a front portion of the airbag cushion and the tether releasing device and configured to be disconnected when the tether releasing device operates; and
- a lateral tether configured to connect two opposite side portions of the airbag cushion and the tether releasing device and configured to be disconnected when the tether releasing device operates,
- wherein when a collision occurs while a passenger seated in a passenger seat is in a relaxed seating state, the airbag cushion is deployed, the front tether is disconnected by an operation of the tether releasing device, and a state in which the lateral tether connects the tether releasing device and the two opposite side portions of the airbag cushion is maintained.

* * * * *